United States Patent
Narasappa et al.

(10) Patent No.: US 9,450,779 B2
(45) Date of Patent: Sep. 20, 2016

(54) EDGE LINK DISCOVERY

(75) Inventors: Sumanth Narasappa, Karnataka (IN); Venkatesh Mahalingam, Karnataka (IN); Kotilingareddy Bhavanam, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 1025 days.

(21) Appl. No.: 12/776,740

(22) Filed: May 10, 2010

(65) Prior Publication Data

US 2011/0274111 A1 Nov. 10, 2011

(51) Int. Cl.
*H04L 12/46* (2006.01)
*H04L 12/715* (2013.01)
*H04L 12/781* (2013.01)
*H04L 12/741* (2013.01)

(52) U.S. Cl.
CPC .......... *H04L 12/4633* (2013.01); *H04L 45/04* (2013.01); *H04L 45/52* (2013.01); *H04L 45/54* (2013.01)

(58) Field of Classification Search
None
See application file for complete search history.

(56) References Cited

U.S. PATENT DOCUMENTS

| 7,593,352 | B2 | 9/2009 | Verma |
| 7,940,768 | B2 * | 5/2011 | Masputra et al. ............ 370/392 |
| 2002/0071439 | A1 * | 6/2002 | Reeves et al. ................ 370/400 |
| 2002/0080794 | A1 * | 6/2002 | Reeves et al. ............. 370/395.2 |
| 2005/0147050 | A1 | 7/2005 | Klink |
| 2006/0002401 | A1 | 1/2006 | Mukherjee et al. |
| 2007/0180104 | A1 * | 8/2007 | Filsfils et al. ................. 709/224 |
| 2009/0154373 | A1 | 6/2009 | Ye et al. |
| 2013/0010642 | A1 * | 1/2013 | Ullas .................. H04L 63/0272 370/254 |

FOREIGN PATENT DOCUMENTS

IN WO 2011126483 A1 * 10/2011 ......... H04L 63/0272

OTHER PUBLICATIONS

Eric C. Rosen, Yakof Rekhter, "RFC 4364 BGP/MPLS IP Virtual Private Networks (VPNs)" http://tools.ietf.org/html/rfc4364.

* cited by examiner

*Primary Examiner* — Hicham Foud
(74) *Attorney, Agent, or Firm* — Brooks, Cameron & Huebsch, PLLC (57) ABSTRACT

A method for discovering a link between an entry-exit device of a computer network and a customer edge device is disclosed. The customer edge device includes an address and the entry/exit point device includes a routing table. Interfaces with the routing table and addresses of the computer network related to the entry/exit point device are obtained. Either a routing protocol or the routing table is used to obtain routing information. The routing information is compared to a selected address to find a match. The routing information the matches the selected address represents the address of the customer edge device.

19 Claims, 7 Drawing Sheets

EDGE LINK DISCOVERY

BACKGROUND

In high performance computer and telecommunications networks, MultiProtocol Label Switching (MPLS) is an example of a highly scalable, protocol agnostic mechanism that directs and carries data from one network node to the next. Network providers using MPLS (or similar technologies) can easily create virtual links between distant nodes and encapsulate packets of various network protocols. Data packets in an MPLS network are assigned labels. Decisions regarding forwarding the packets are made solely on the contents of the labels without having to examine the contents of the packets. MPLS provides the ability to create end-to-end circuits across any type of transport medium, using any suitable protocol, to carry many different types of network traffic. Various technologies are or were deployed with similar goals, and such technologies include asynchronous transfer mode, or ATM, and frame relay. MPLS technologies use less overhead than ATM technologies to provide connection-oriented services for variable length frames. MPLS technologies, however, preserve the traffic engineering and out-of-band control benefits of ATM and frame relay technologies for deploying large-scale networks. Many network engineers believe that MPLS will soon replace these other technologies.

While MPLS provides many traffic management benefits, such as better reliability, increased performance, and other benefits compared to other technologies, MPLS is not without its shortcomings. For example, MPLS provides a significant loss of visibility and access into a cloud than other technologies. The loss of visibility and a related diminished capacity for discovery makes managing the network more difficult for service providers and other network managers.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
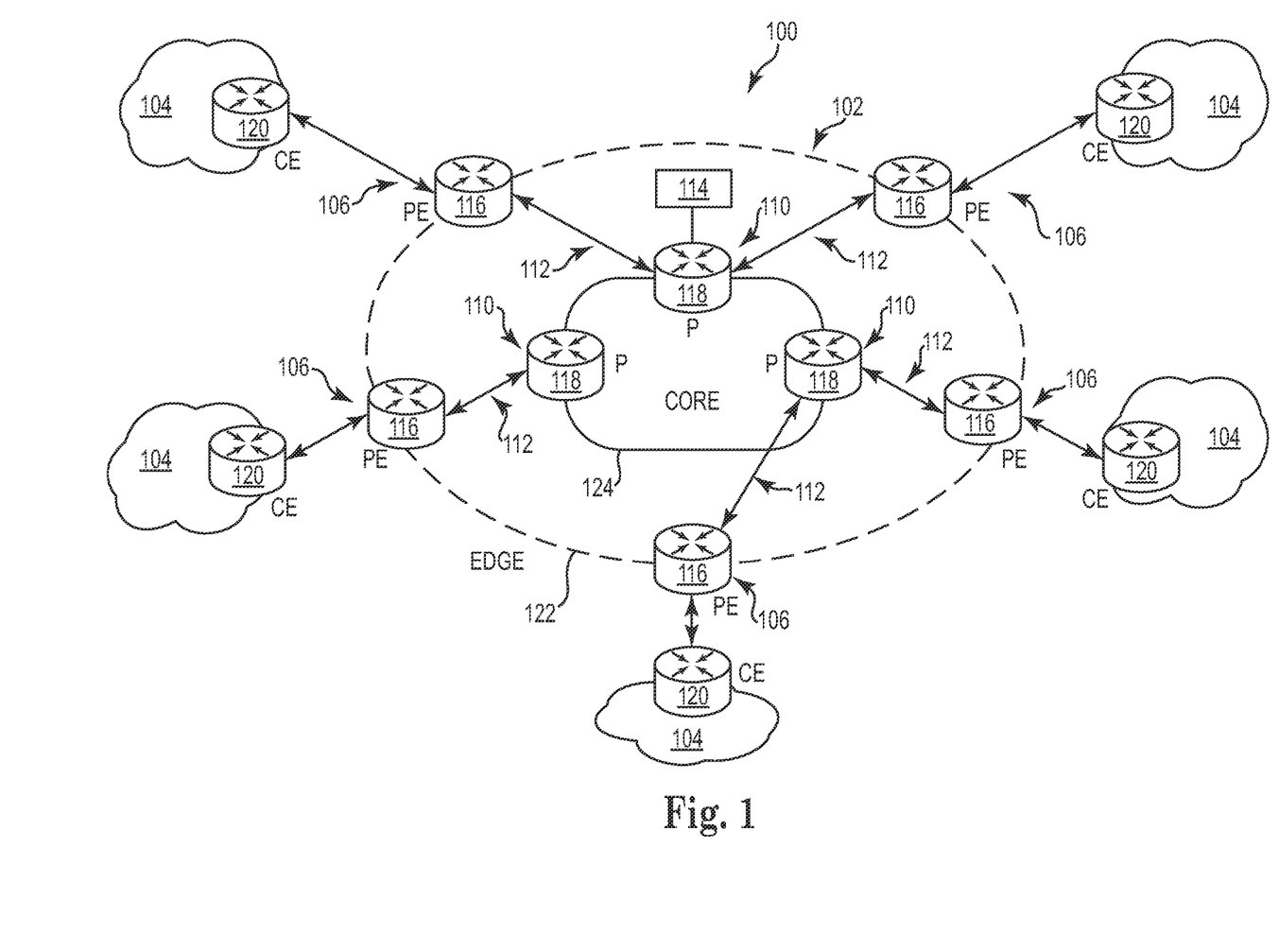
FIG. 1 is a block diagram illustrating an embodiment of an operating environment.

FIG. 1 illustrates an embodiment of an operating environment 100. The operating environment 100 includes a provider network 102, such as a service provider network managed by an Internet provider. The provider network 102 is coupled to a plurality of customer networks 104, where others than the Internet provider manage the customer networks 104. For purposes of illustration, the provider network 102 is described as an MPLS network, and the below-described features of the provider network apply to MPLS features. Other types of networks can provide a suitable operating environment, such as technologies similar to MPLS, later developed versions of MPLS type networks, and/or successors of similar technologies.

In the operating environment 100, the entry and exit points 106 of the provider network 102 are logically disposed to interface with the customer networks 104. The entry and exit points 106 are Label Edge Routers (LERs). The LERs "push" a label (MPLS label) onto a packet that is coming in to the provider network 102, and the LERs "pop off" the label on an outgoing packet. The entry and exit points 106 are connected to routers 110 within the provider network 102, or within the core of the network. Routers 110 are often connected to other routers 110 and can be connected to entry and exit points 106. Such routers 110 are Label Switch Routers, or LSRs. The LSRs perform routing within the provider network 102 based on the labels assigned to the packets. The logical interconnections 112 between routers 110 and also between routers 110 and entry and exit points 106 can be referred to as Label Switch Paths (LSPs). The provider network 102 or a network manager establishes the interconnections 112, with a computing device 114, such as a server, logically coupled to the provider network 102. The computing device 114 can run software applications which can be used to establish or manage the interconnections, among other features or aspects of the provider network 102, for a suited purpose such as for a network-based MPLS/BGP Virtual Private Network (VPN).

In an MPLS-based VPN, the entry and exit points 106 are Provider Edge (PE) routers 116 disposed at the logical edge 122 of the provider network 102. The routers 110, which function as transmit routers within the core 124, are Provider (P) routers 118. The customer networks 104 connected to the provider network include a Customer Edge (CE) router 120 logically coupled to the PE router 116 and is established with a routing protocol such as Border Gateway Protocol (BGP)

or more particularly External Border Gateway Protocol (eBGP) and other protocols such as Open Shortest Path First (OSPF), Enhanced Interior Gateway Routing Protocol (EI-GRP), Routing information Protocol (RIP), static route, and the like. An MPLS VPN services peer at Layer 3 with the customer networks 104, and can be abbreviated as L3VPN service provider network. Layer 3 generally refers to the reference model of the architecture for Open Systems Interconnections (OSI) established by the International Organization for Standards, or ISO, under ISO/TC97/SC16 established in or about 1979. More particularly, Layer 3 refers to the Network Layer, which includes network-oriented protocols.

Figure 2:
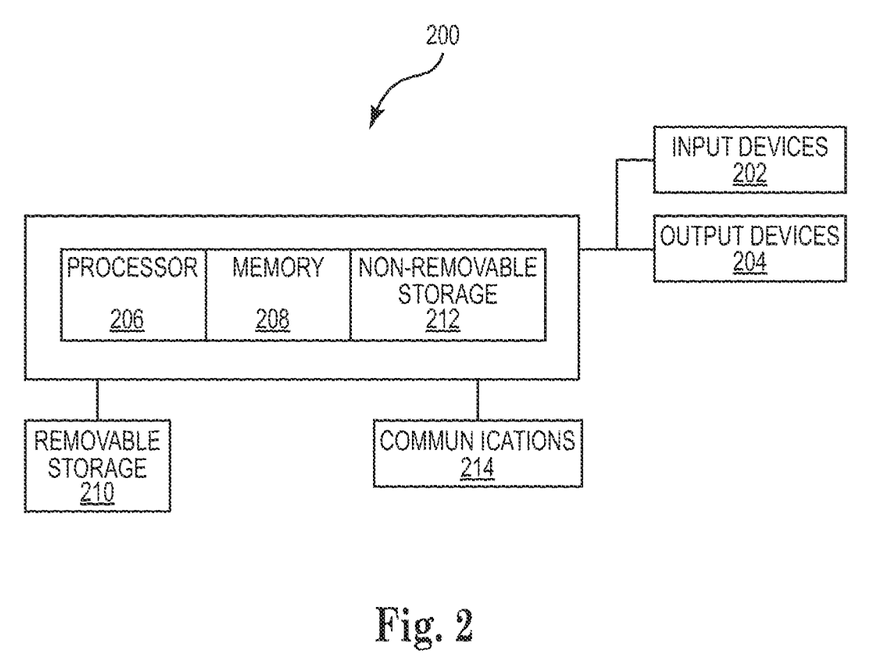
FIG. 2 is a block diagram illustrating an embodiment of a computing device suitable for use with the operating environment of FIG. 1.

FIG. 2 illustrates an embodiment of a computer system including device 200 that can be employed in the operating environment 100 as the computing device 114 in the provider network 102. In one example, the computing device 200 can include or can be coupled to one or more input devices 202, such as keyboard, pointing device (e.g., mouse), voice input device, touch input device, or the like. Computing device 200 can also include or can be coupled one or more output devices 204, such as a display, printer, or the like. In a basic configuration, computing device 200 typically includes a processor architecture having at least one processing unit, i.e., processor 206, and memory 208. Depending on the configuration and type of computing device, memory 206 may be volatile, non-volatile, or some combination of the two. The memory 208 can be arranged in a memory hierarchy such as a cache. Computing device 200 can also include additional storage including, but not limited to, magnetic or optical disks or solid state memory, or flash storage devices such as removable storage 210 and non-removable storage 212 for storage of information such as computer readable instructions, data structures, program modules or other data. The computing device 200 can be configured to run an operating system software program that can be stored on the storage media as well as one or more software applications, which make up a system platform. Memory 208, removable storage 210 and non-removable storage 212 are all examples of computer storage media that can be used to store the desired information and that can be accessed by computing device 200. Computer storage media can be part of computing device 200. Computing device 200 can also include one or more communication connections 214 that allow the computing device 200 to communicate with the provider network 102 or the elements of the provider network 102.

The computing device 200 can be made to run a software application as part of a network management system (NMS). The network management system can be used to monitor and administer the provider network 102. In an L3VPN service provider network, for example, network management systems also benefit from the discovery, visualization, and monitoring the customer edges. More particularly, network management systems seek to discover customer edge nodes, customer edge interfaces, IP addresses, and links between PE routers 116 and CE routers 120 to monitor and react to faults on the CE routers 120 or similar devices. A subnet analysis of the provider network 102 is a suitable mechanism to discover certain types of links between PE routers 116 and CE routers (PE-CE links), but the subnet analysis is unable to discover PE-CE links in certain circumstances involving overlapping address domains (DuplicateIP or DupIP, or router redundancies configured on PE routers 116 or CE routers 120 (such as those of Hot Standby Router Protocol, or HSRP, Virtual Router Redundancy Protocol, or VRRP, and other similar protocols). A subnet analysis applied in DupIP/HSRP/VRRP circumstances can lead to incorrect results when a customer configures the CE routers 120 to PE routers 116 with a subnet overlapping with the subnet addressing of another customer's PE-CE connection. Similarly, querying an Address Resolution Protocol (ARP) cache to obtain a media access control address, or MAC address, on the PE router 116 or CE router 120 resolves some, but not all, ambiguities in DupIP circumstances.

Figure 3:
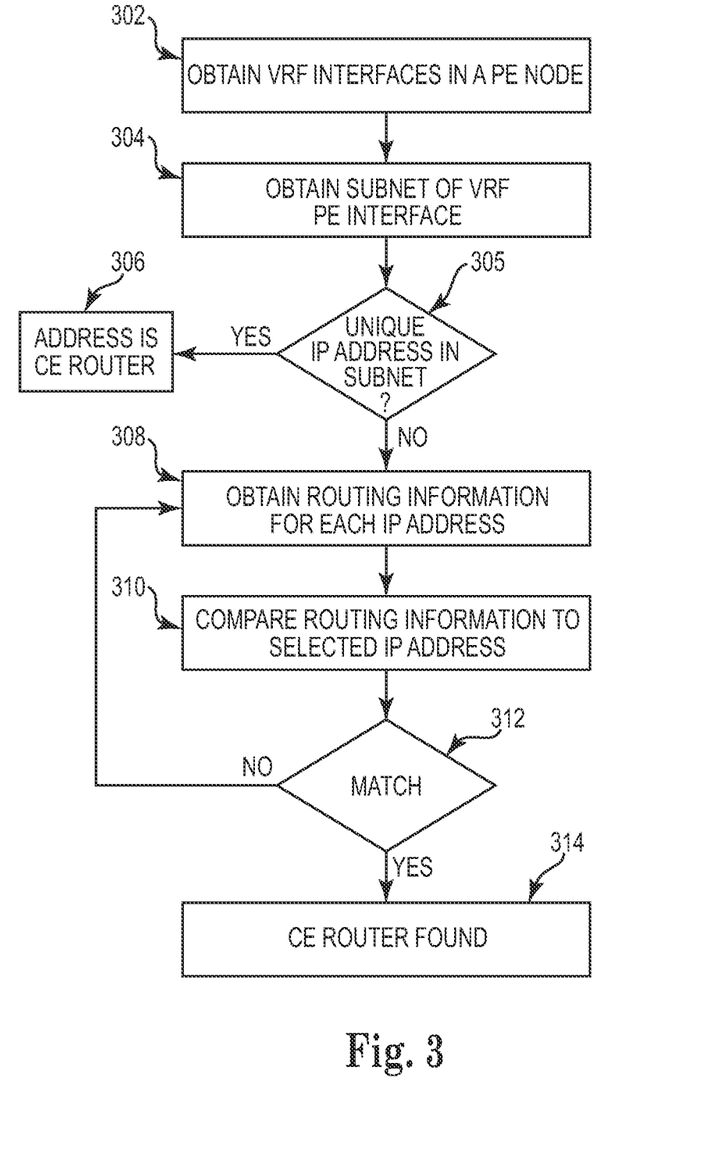
FIG. 3 is a flow diagram illustrating an embodiment of a method.

FIG. 3 is a block diagram illustrating a method for discovery of edge links 300. The method 300 can be incorporated into a mechanisms deployed to manage a network, as a software application, as part of a larger network management software application, as a plug-in for a software application, or the like. In one embodiment, a computer readable storage medium, such as memory 208 or a form of removable storage 210 or non-removable storage 212, is configured to store computer executable instructions for controlling a computing device, such as computing device 200 to perform the method 300. In another embodiment, a network management system or subsystem, including a combination of hardware and software feature can employ method 300.

In one embodiment, the method 300 provides for discovery and visualization edge devices and links such as CE devices, including CE routers 120, PE routers 116, and PE-CE links in a provider network, such as L3VPN. In one embodiment, the discovery and visualization of edge devices occurs in the provider network 102. The provider, through computing device 200, has communication access to the CE routers 120 and can query the routers and network with Simple Network Management Protocol (SNMP). The method 300 can be applied to Virtual Routing Forwarding, or VRF, which is a technology in IP-based computer networks that allows multiple instances of a routing table to simultaneously co-exist within the same router. The routing instances are independent from each other, and thus overlapping IP addresses can be used without interfering or conflicting with each other. A network management system on, for example, the computing device 114 can discover VRFs and associated interfaces on a PE router 116.

In the embodiment of method 300, VRF interfaces in a PE router 116, or node, are obtained at 302. The IP addresses in a subnet of the PE router 116 are also obtained at 304 where a subnet is a distinctly addressed portion of an IP network. In the scenario where the subnet is /30 and the IP address obtained from the CE router 306 is unique, the process is complete. In a scenario where multiple similar IP addresses or IP addresses falling into the same subnet are found, each of these IP addresses are considered to be candidates for further processing. Based on the routing protocols running between PE router 116 and CE router 120, queries on routing protocol with the candidate IP addresses are executed. The responses from these queries are compared with the management IP addresses of already discovered PE routers 116 and CE routers 120. If there is a match, the CE router 120 is bound to the corresponding PE router 116 where the match was found. If there is no match, the method 300 continues to search for a match 316. In the illustrated embodiment, the method returns to 308 and repeats. In an embodiment, the method 300 obtains a set of information at 308, and the method returns to 310.

Method 300 includes several advantages, and a few of these advantages are described here. The method 300 provides discovery of PE-CE links in duplicate IP, router redundancy, and unmanaged CE router 120 scenarios such as a node that does not have SNMP access to the NMS.

Discovery of the PE-CE links is accurate because any ambiguities are resolved with a neighbor/peer analysis at 308 and 310. The approach is generally straightforward, requiring relatively smaller amounts of overhead in return for accuracy. Further, method 300 is scalable. When information is obtained from the routing protocol at 308, there is no query to route tables or subnet analysis. When routing table information is obtained at 308, pointed queries are used instead of general queries.

Figure 4:
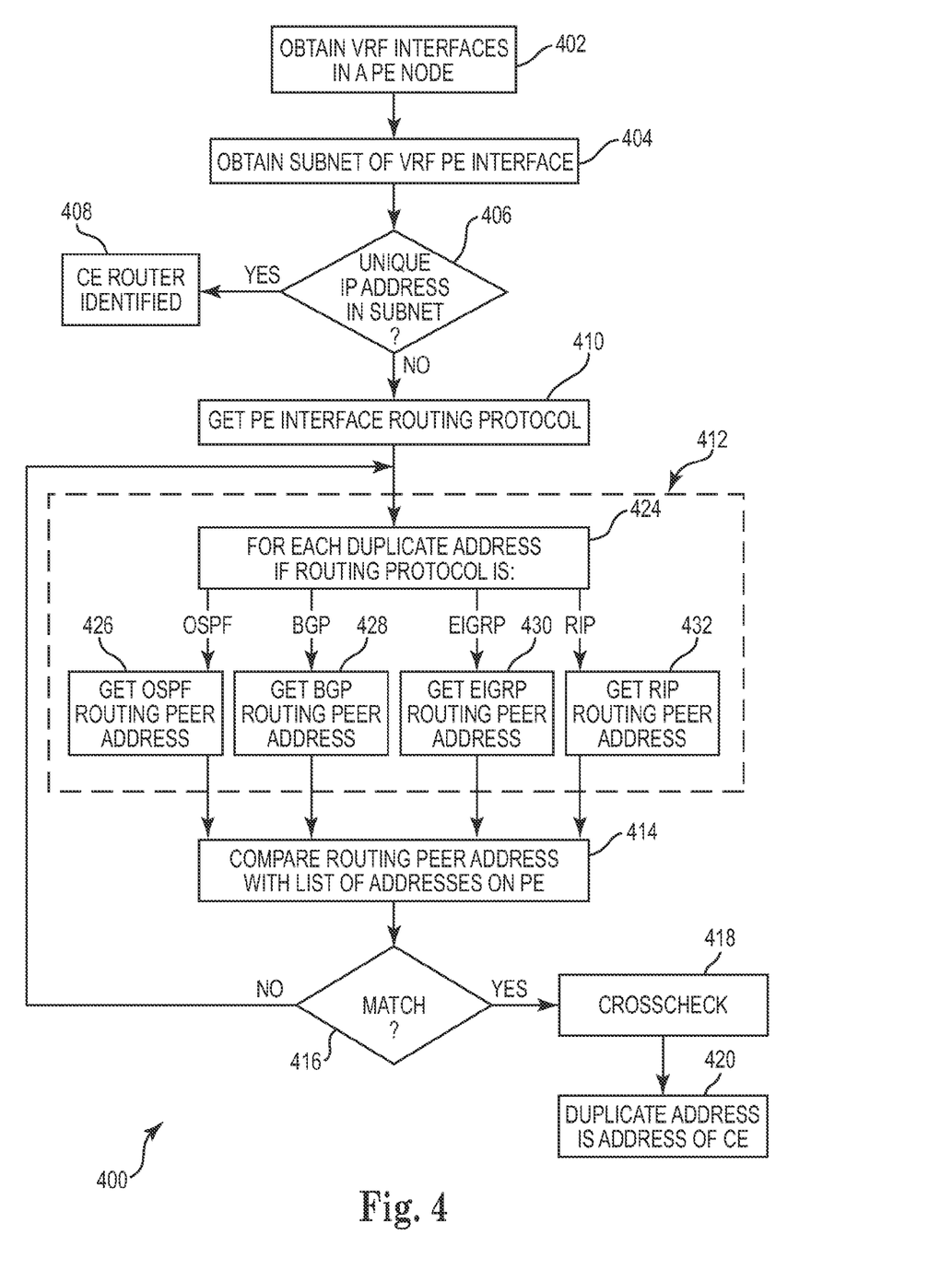
FIG. 4 is a flow diagram illustrating an embodiment of the method of FIG. 3.

FIG. 4 illustrates an embodiment 400 of the method 300 to discover PE-CE links with a routing protocol. In one example, exterior gateway protocols are used to exchange information between routers or devices. The PE router 116 interfaces are obtained at 402, and a subnet mask is obtained for each PE router interface at 404. In cases where the IP addresses of the subnet at 406 are unique and there is no overlapping subnet, the CE router 120 is identified at 408. In the case of more than one IP address in the subnet, at 406, a routing protocol is obtained for each PE router interface at 410. For each duplicate IP address, the routing peer address is obtained through the routing protocol at 412, and then the routing peer address is compared with the IP address of the PE router at 414. If the routing peer address does not match the IP address at the PE router, at 416, the method 400 repeats at 412 with another duplicate IP address. If the routing peer address matches the IP address at 416, the method 400 can verify that PE router 116 has a routing peer with the CE router IP address at 418. If so, the duplicate address is determined to be the address of the CE router at 420.

In the embodiment shown, the routing protocol can be one of at least Open Shortest Path First (OSPF), eBGP, Enhanced Interior Gateway Routing Protocol (EIGRP), and Routing information Protocol (RIP). The particular routing protocol is determined at 424.

In the case of OSPF, the OSPF routing peer address can be determined from:
ospfNbrRtrId (1.3.4.1.2.1.14.10.1.3.peIpAaddress) from an OSPF management information base (which can be communicatively coupled to the computing device 200) at 426.

In the case of BGP, the BGP routing peer address can be determined from:
bgpPeerIdentifier (1.3.6.1.2.1.15.3.1.1.peIpAaddress) from a BGP management information base at 428.

In the case of EIGRP, the EIGRP routing peer address can be determined from:
cEigprpPeerAddr (1.3.6.1.4.1.9.9.449.1.4.1.1.3.peIpAaddress) from an EIGRP management information base at 430.

In the case of RIP, the RIP routing peer address can be determined from:
rip2PeerAddress (1.3.6.1.2.23.4.1.1.peIpaddres) from an RIP management information base at 432.

Figure 5:
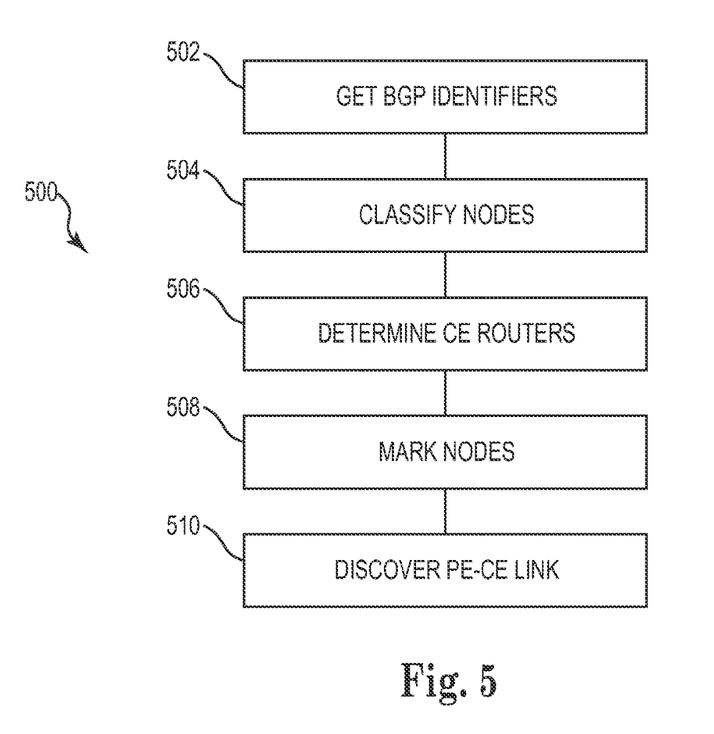
FIG. 5 is a block diagram illustrating an embodiment of the method of FIG. 4.

FIG. 5 illustrates a flow diagram of an embodiment of FIG. 4. FIG. 5 includes a method 500 of discovering PE-CE links using eBGP neighbor analysis, which can be readily modified to include routing protocols other than eBGP. In method 500, eBGP identifiers are discovered at 502. The eBGP identifier and a local autonomous system, or AS, identifier is used to identify a router. The AS is a collection of connected IP routing prefixes under the control of one or more network managers that presents a common, clearly defined routing policy to a network. To get the eBGP identifier, the management information base is queried bgpIdentifier (1.3.6.1.2.1.15.4). To get the local AS identifier, the management information base is queried bgpLocalAS (1.2.6.1.2.1.15.2). The eBGP identifier and the local AS identifier are stored, such as in memory 208.

A node in the provider network 102 can be classified as a PE 116 router, P router 118, or a CE router 120 at 504. In one embodiment, any VRFs configured on the router can be determined by querying the management information base of an MPLS with mplsVpnVrfName (1.3.6.1.3.118.1.2.2.1.1). If VRFs are configured, the router is a PE router 116. To obtain a list of PE interfaces associated with the VRF, mplsVpnInterfaceLabelEdgeType (1.3.6.1.3.118.1.2.1.1.2) is queried, which provides a value of an interface index of an ofIfTable and associated VRF. The VRFs are stored in a topology along with its associated PE interface, which are now discovered.

If the node is not a PE router 116, method 500 seeks to determine if the node is a CE router 120 at 506. The node is queried for eBGP identifiers with bgpPeerIdentifier (1.3.6.1.2.1.15.3.1.1). The eBGP identifiers obtained in 502 are retrieved to determine all of the eBGP peers. The eBGP peers are processed as in 504 to determine a set of PE routers 116 as eBGP peers. The PE routers determined to be eBGP peers store an IP address of the CE router associated with it and also includes information on the VRF, which can be obtained by querying the management information base with mplsVpnVrfBgpNbrAddr (1.3.6.1.3.118.1.2.4.1.4) to return a list of IP addresses. The BGP peer table can also be indexed by remotePeerAddress. The CE router's address that is used to exchange eBGP is used as an index in the eBGP peer table of PE router 116, which is one way to get the IP address of the CE router 120. If the IP address is configured on the node then the router is the CE router 120.

PE routers 116 and CE routers 120 are identified and the nodes are stored in a topology and marked as a PE router or a CE router at 508. Additionally, eBGP peers for the CE router 120 and the VRF name that the CE router connects can also be stored. Still further, the IP address on the CE router used to connect to the PE router and the interface on the CE router that has the IP address is also stored.

With this stored information, the PE-CE link is discovered at 510. Several scenarios are described, including identifying the PE-CE links in a non-overlapping domain network, identifying PE-CE links in a duplicate IP environment, identifying links in HSRP/VRRP scenarios, and in discovery of CE routers without SNMP access.

Figure 6:
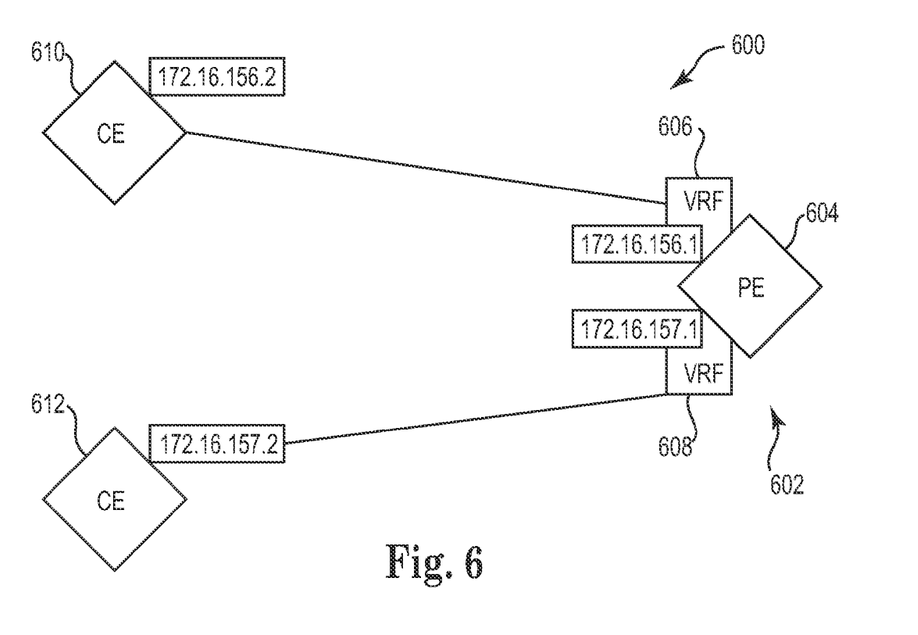
FIG. 6 is a schematic diagram illustrating an embodiment of a portion of a non-overlapping address domain network.

FIG. 6 illustrates an example environment of a PE-CE link in a non-overlapping address domain 600. The PE 602 includes a PE node 604, such as a PE router, having a first VRF 606 with associated PE interface address as 172.16.156.1 and a second VRF 608 with associated PE interface address as 172.16.157.1. The first VRF 606 is connected to a first CE router 610 having an interface address 172.16.156.2, and the second VRF 608 is connected to a second CE router 612 having an interface address 172.16.157.2. FIG. 6 is used to describe how method 500 discovers edge links in 510 in a non-overlapping environment such as 600.

The CE routers 610, 612 and the CE interfaces are known from method 500 from features 502, 504, 506, 508. The eBGP peer table of the CE routers 610, 612 reports the PE node 604 as its neighbor. The indexed IP address corresponds to the eBGP identifier on the PE node 604, and the interface with this IP address on the PE node 604 is determined to be the PE interface. The PE node 604 reports that the first CE router 610 and second CE router 612 as eBGP peers. The eBGP identifiers of the first and second CE routers 610, 612 can be determined from a peer table. The eBGP peer table can also be used to infer the IP addresses of the CE routers 610, 612. When the BGP Peer tables on the CE routers 610, 612 are queried, the IP addresses of the PE node 604 are the same, and thus the PE node 604 is verified. The edge link is discovered, as in 510.

Figure 7:
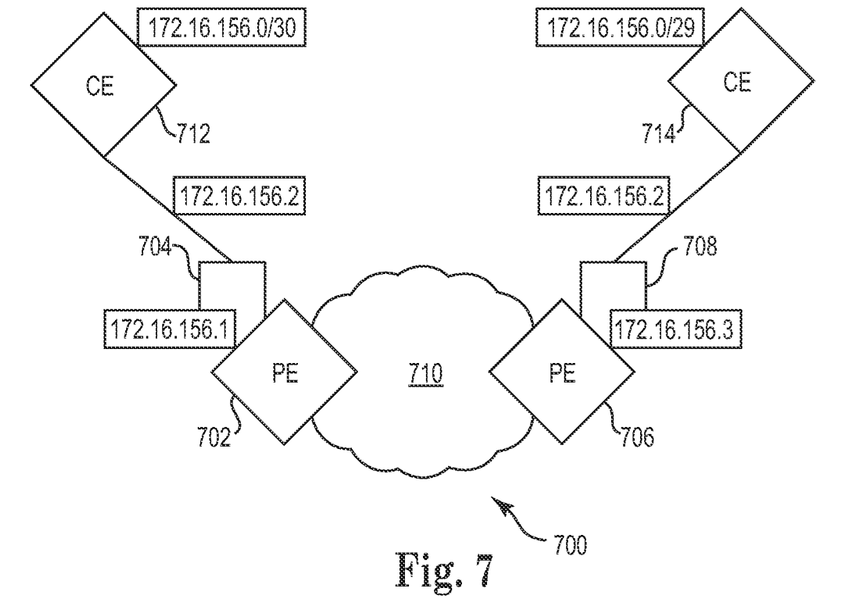
FIG. 7 is a schematic diagram illustrating a first embodiment of a portion of an overlapping address domain network.

Method 500 can also be used in environments of a PE-CE link with overlapping address domains. FIG. 7 illustrates an example environment 700 where the same IP/subnet is configured on customer edge routers belonging to different VRFs of different VPN' connected to different provider edge routers. More particularly, a first PE node 702, with a first VRF 704 having an example IP address of 172.16.156.1, and a second PE node 706, with a second VRF 708 having a VRF associated PE interface address of 172.16.156.3 are included in a provider network 710, such on an MPLS cloud. The first VRF 704 is linked to a CE router 712 having an example IP address of 172.16.156.2 from subnet 172.16.156.0/30. The second VRF 708 is linked to a CE router 714 having a VRF associated CE interface address that is the same as the first CE router 712, i.e. 172.16115612 from subnet 172.16.156.0/29. Features 502, 504, 506, and 508 are applied to determine CE routers 702 and 706 IP addresses. The method of peer analysis 510, described in connection with the environment of FIG. 6, is also applied here. In FIG. 7, the first PE node 702 will not report the second CE router 714 as a peer, which can occur in a subnet analysis.

Figure 8:
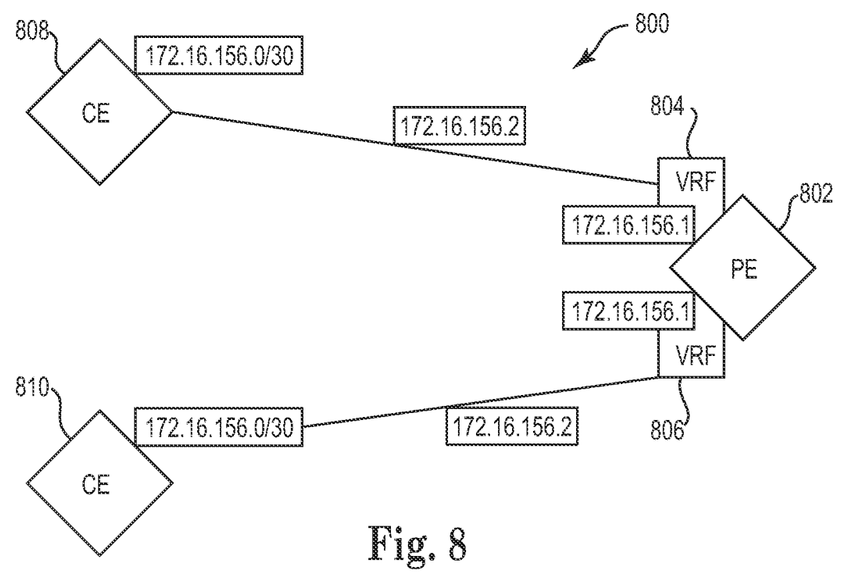
FIG. 8 is a schematic diagram illustrating a second embodiment of a portion of an overlapping address domain network.

FIG. 8 illustrates an example environment 800 where the same IP/subnet is configured on customer edge routers belonging to different VRFs of different VPNs connected to a same provider edge router. More particularly, PE node 802 includes a first VRF 804 having a VRF associated PE interface address of 172.16.156.1, and a second VRF 806 having a VRF associated PE interface address of 172.16.156.1. The first VRF 804 is linked to a CE router 808 having a VRF associated CE interface address of 172.16.156.2 from subnet 172.16.156.0/30. The second VRF 806 is linked to a CE router 810 having a VRF associated CE interface address that is the same as the interface address of the first CE router 808, i.e. 172.16.156.2 from subnet 172.16.156.0/30. Features 502, 504, 506, and 508 from method 500 in FIG. 5 are applied to determine CE routers 808 and 810 IP addresses. The method of peer analysis 510, described above, is applied.

Figure 9:
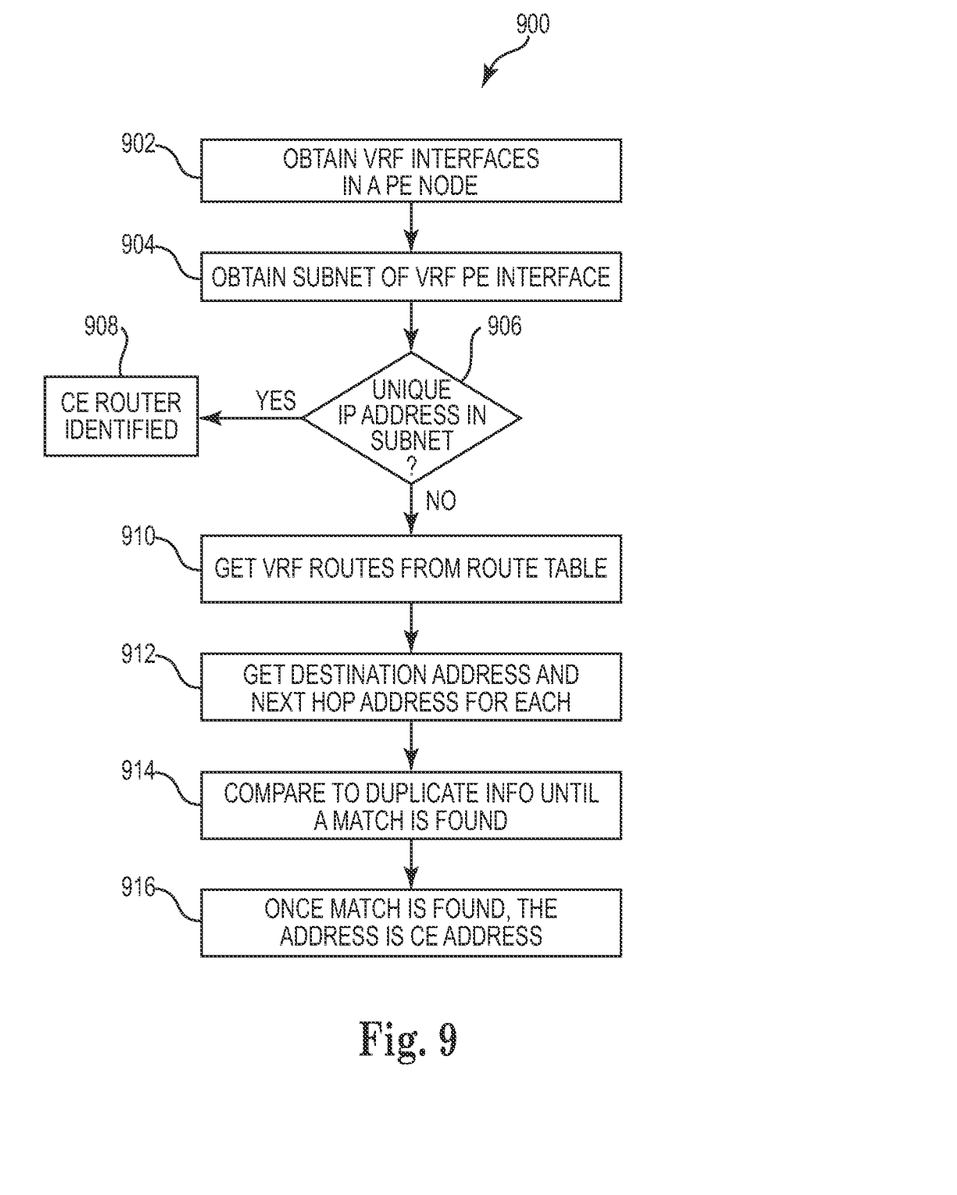
FIG. 9 is a flow diagram illustrating another embodiment of the method of FIG. 3.

FIG. 9 illustrates an embodiment 900 of the method 300 of FIG. 3, to discover PE-CE links without the use of a routing protocol. The VRF associated PE router 116 interfaces are obtained at 902 and a subnet mask is obtained for each VRF associated PE router interface at 904. If there is no overlap of IP addresses and the subnet of the VRF associated PE interface at 906, there are no duplicate addresses and CE router 120 is identified at 908. In the case of more than one IP address in the subnet, at 906, local routes for the PE interface are obtained from a VRF table at 910. For each route obtained from the VRF table, the route address and the route next hop address can be obtained at 912. The route address and the next hop address of each route are compared to a duplicate node loopback/management address and to a duplicate node physical interface address at 914 until a match is discovered. Once there is a match, the duplicate node discovered is the CE router 120 attached to a PE interface at 916.

In the case of unnumbered serial interfaces, which often include directly connected point-to-point serial links, the approach can be modified for use with a link layer discovery protocol, or LLDP. Examples of LLDPs can include propriety protocols from Cisco Systems, Inc., of San Jose, Calif., Enterasys Networks, Inc., of Andover, Md., and so on. Other devices with unnumbered serial interface configurations for Ethernet based on virtual local area networks (VLANs) or trunk ports. In one example, the PE-CE link can be discovered with a layer 2 VPN connection of the PE interface and is derived from the LLDP. If the PE address is a VLAN interface, a VLAN number of the PE interface, or VLAN ID, is used to discover the PE-CE link.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for discovering a link between an entry-exit device of a provider network and a customer edge device to be performed with a processor, wherein the customer edge device includes an address and the entry-exit device includes a routing table, the method comprising:
   obtaining an interface from the routing table, wherein the interface includes a plurality of Internet protocol addresses corresponding with a plurality of customer edge devices in a subnet of the interface, and wherein the plurality of Internet protocol addresses in the subnet include duplicate Internet protocol addresses for different customer edge devices that include overlapping address domains or router redundancies;
   obtaining routing information from a routing protocol;
   comparing the routing information to each duplicate Internet protocol address in the subnet to find a match wherein the matching Internet protocol address in the subnet represents the address of the customer edge device; and
   communicating between the entry-exit device and the customer edge device corresponding to the matched IP device based on the matched IP address.

2. The method of claim 1 wherein the entry-exit device includes a plurality of simultaneous routing tables.

3. The method of claim 2 wherein the plurality of simultaneous routing tables are provided with a virtual route forwarding technology.

4. The method claim 1 wherein the entry-exit device is a provider edge router and wherein the customer edge device is a customer edge router.

5. The method of claim 4 wherein the provider network is implemented in a multiprotocol label switching mechanism.

6. The method of claim 5 wherein obtaining interfaces and the plurality of addresses includes obtaining interfaces of the provider edge router and obtaining Internet protocol address with a subnet mask.

7. The method of claim 6 wherein a routing protocol peer address is obtained for each duplicate Internet protocol address.

8. The method of claim 7 wherein the comparing includes comparing the routing peer address to Internet protocol address of the provider edge router for a match.

9. The method of claim 8 wherein if a match is found between the routing peer address and the Internet protocol address of the provider edge router, then verifying the provider edge router has a routing peer with an Internet protocol address of the customer edge router.

10. A computer readable storage medium operable in a provider network having a provider edge router, including an address, coupled to a customer edge router with a link, the computer readable storage medium being a non-transitory storage medium storing computer executable instructions for controlling a computing device to perform a method comprising:

obtaining an interface from the provider edge router, wherein the interface includes a plurality of Internet protocol addresses corresponding with a plurality of customer edge devices in a subnet of the interface, wherein the interface includes an associated routing protocol, and wherein the plurality of Internet protocol addresses in the subnet include duplicate Internet protocol addresses for different customer edge devices that include overlapping address domains or router redundancies;

obtaining a routing peer address from the associated routing protocol for each duplicate Internet protocol address in the subnet;

comparing the routing peer address of a selected duplicate Internet protocol address to address of the provider edge router until a match is determined;

discovering the link when the matched routing peer address and Internet protocol address of the provider edge router if the provider edge router is a routing peer with an Internet protocol address of the customer edge router; and     communicating between the provider edge router and the customer edge router based on matched routing peer address.

11. The computer readable storage medium of claim 10 wherein the associated routing protocol is selected from a set of open shortest path first, border gateway protocol, enhanced interior gateway routing protocol, and routing information protocol.

12. The computer readable medium of claim 10 wherein the routing peer addresses are obtained from a management information base coupled to the computing device.

13. The computer readable medium of claim 10 wherein the provider network includes a plurality of nodes, and where the obtaining the interface, the Internet protocol addresses, and the routing peer address includes:

obtaining border gateway protocol identifiers from a management information base;

classifying nodes in the provider network as provider edge routers based on information obtained from the management information base; and     classifying nodes in the provider network that are not provider edge routers as customer edge routers based on the border gateway protocol identifiers.

14. The computer readable medium of claim 10 link is configured on an overlapping address domain.

15. The computer readable medium of claim 14 wherein a same Internet protocol subnet is configured on customer edge routers belonging to different virtual routing forwarding tables on different provider edge routers.

16. The computer readable medium of claim 14 wherein a same Internet protocol subnet is configured on customer edge routers belonging to different virtual routing forwarding tables on a single provider edge router.

17. A computer readable storage medium operable in a provider network having a provider edge router coupled to a customer edge router with a link, the computer readable storage medium being a non-transitory storage medium storing computer executable instructions for controlling a computing device to perform a method comprising:

obtaining an interface from the provider edge router, wherein the interface includes a plurality of Internet protocol addresses corresponding with a plurality of customer edge devices in a subnet of the interface, and wherein the plurality of Internet protocol addresses in the subnet include duplicate Internet protocol addresses for different customer edge devices that include overlapping address domains or router redundancies;

obtaining a route address and a route next hop address for each interface route from a virtual route forwarding table in the provider edge router;

comparing the route address and a route next hop address to a loopback-management address and a physical interface address for each duplicate Internet protocol address in the subnet to find a match, wherein the matching duplicate Internet protocol address in the subnet represents the customer edge router linked to the provider edge router; and     communicating between the customer edge router and the provider edge router based on the matched Internet Protocol address.

18. A computer readable storage medium of claim 17 wherein the provider edge router includes a plurality of interfaces.

19. A computer readable storage medium of claim 17 wherein the comparing the route address and the route next hop address includes comparing a plurality of route addresses and route next hop addresses until a match is found.

\* \* \* \* \*